(12) United States Patent
Fraim et al.

(10) Patent No.: US 11,846,172 B1
(45) Date of Patent: Dec. 19, 2023

(54) METHOD FOR WELL RE-STIMULATION WITH HYDRAULIC FRACTURE TREATMENTS

(71) Applicant: Mainfraim Industries LLC, Corrales, NM (US)

(72) Inventors: Michael Fraim, Corrales, NM (US); Jean-Marc Grindatto, Corrales, NM (US); John Ely, Houston, TX (US)

(*) Notice: Subject to any disclaimer, the term of this patent is extended or adjusted under 35 U.S.C. 154(b) by 40 days.

(21) Appl. No.: 17/530,964

(22) Filed: Nov. 19, 2021

Related U.S. Application Data

(60) Provisional application No. 63/116,091, filed on Nov. 19, 2020.

(51) Int. Cl.
*E21B 43/267* (2006.01)
*E21B 43/26* (2006.01)
*E21B 47/0224* (2012.01)
*G01V 1/28* (2006.01)

(52) U.S. Cl.
CPC ............ *E21B 43/267* (2013.01); *E21B 43/26* (2013.01); *E21B 47/0224* (2020.05); *G01V 1/288* (2013.01); *G01V 2210/1234* (2013.01)

(58) Field of Classification Search
CPC .... E21B 43/267; E21B 43/26; E21B 43/2605; E21B 43/2607; E21B 43/27; E21B 47/0224; G01V 1/288; G01V 2210/1234
See application file for complete search history.

(56) References Cited

U.S. PATENT DOCUMENTS

| | | | |
|---|---|---|---|
| 8,437,962 B2 * | 5/2013 | Craig | E21B 43/26 166/308.1 |
| 2013/0199781 A1 * | 8/2013 | Dale | E21B 43/267 166/305.1 |
| 2013/0199789 A1 * | 8/2013 | Liang | E21B 43/263 166/305.1 |

* cited by examiner

*Primary Examiner* — Catherine Loikith
(74) *Attorney, Agent, or Firm* — Justin R. Jackson; Peacock Law P.C.

(57) ABSTRACT

A method for fracking a well to reorient vertical fractures into horizontal fractures throughout a target reservoir, including target reservoirs having multiple thin heterogeneous target production zones. The method involves sequentially fracking and injecting proppant at periodic vertical intervals, while monitoring in real time, at least until a dip of an adjacent hydraulic fracture has rotated to a horizontal orientation.

10 Claims, 7 Drawing Sheets

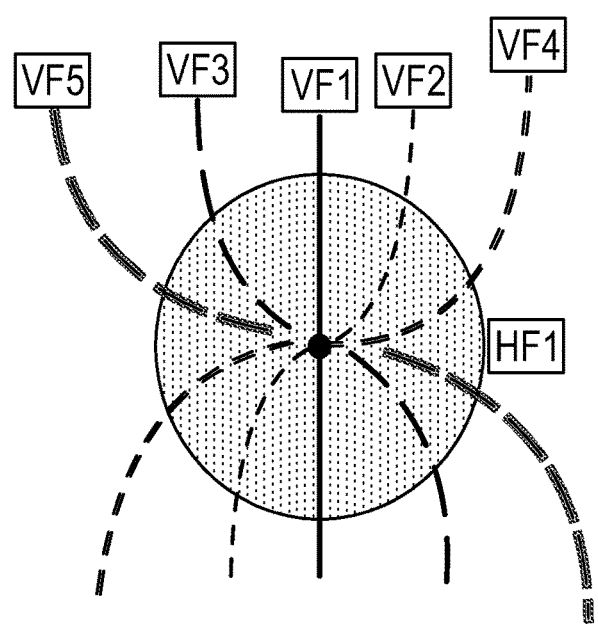
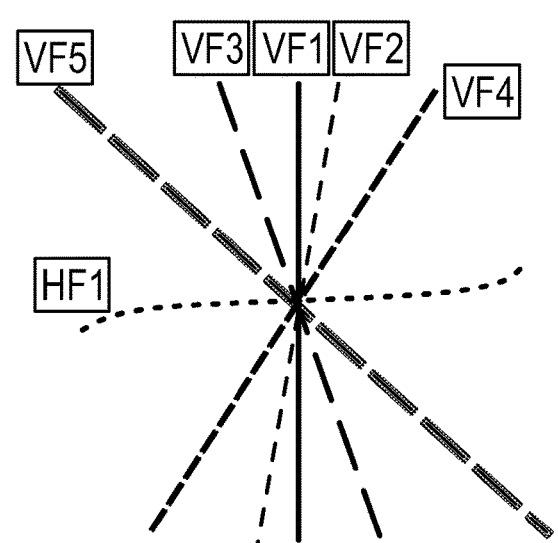
FIG. 5A                    FIG. 5B

METHOD FOR WELL RE-STIMULATION WITH HYDRAULIC FRACTURE TREATMENTS

CROSS-REFERENCE TO RELATED APPLICATIONS

This application claims priority to and the benefit of the filing of U.S. Provisional Patent Application No. 63/116,091, entitled "Method for Well Re-Stimulation With Rubblizing Hydraulic Fracture Treatments", filed on Nov. 19, 2020, and the specification thereof is incorporated herein by reference.

BACKGROUND OF THE INVENTION

Embodiments of the present invention relate to increasing the production rate of depleted oil and gas zones by massive fracturing of the target productive reservoir volume. More particularly, the fracturing method changes the stress orientation of the target reservoir volume to create a series of re-oriented fractures from the perforated interval of the wellbore.

In the late 50's to early 60's vertical wells where hydraulically fractured with sand and viscous polymer solutions to create single vertical fractures in competent sandstones between bounding shales. For thick sandstones over 100 ft., multiple hydraulic fracture treatments where completed at different depths in sandstone interval intersected by the vertical well to fracture treat the whole productive interval.

By the 80's, the industry was drilling deviated wells with deviation angles up to 60 degrees to increase the number of perforated intervals for hydraulic fracturing thinner sandstone or carbonate reservoirs (i.e., less than 50 ft. thick). This stimulation technique could increase the number of hydraulic fractures to 3 without re-fracturing a previous hydraulic fracture in a lower interval. With the advent of bit steering equipment in the late 80's, horizontal wells could be drilled economically on land in productive zones with less than 50 ft. thickness.

Initially, the objective of drilling a horizontal well was to replace multiple vertical well completions with multiple single vertical fractures with spacing ranging from 500 to 1000 ft. along the horizontal wellbore. The horizontal wellbore length was usually less than 4000 ft. in a section. At these hydraulic fracture spacings, there was no hydraulic fracture stress interference to change the direction of the hydraulic fracture direction.

Then, as drilling and completion tools and bits became cheaper to run in the 90's, the horizontal well length exceeded 5000 ft. and hydraulic fracture spacing was less than 500 ft., but more than 300 ft. At that time, in completion technology, surface micro-seismic measurements were showing significant hydraulic fracture stress interference with the natural principal stress state of the formation and hydraulic fracture treatments were re-fracturing the previous hydraulic fracture. This induced stress interference was causing about every 4th to 6th hydraulic fracture to re-fracture the 3rd to 5th hydraulic fracture path and not stimulate that section of the horizontal well. One method to prevent interference was called the "Texas 2 step" which was fracturing the horizontal well every 400-500 ft. then start over at the toe of the horizontal well and fracture in between previous fractures which technically solved the fracture stress interference problem, but the completion cost where not economical except on the prolific formations.

The second method to solve the hydraulic fracture interference problem was cluster fracturing in 2000's with 8 to 10 perforations spaced at 10 to 20 ft. intervals with completion intervals spaced at 100 to 200 ft. apart. This allowed between 20% to 35% of the cluster fractures to intercept previous cluster fractures when there was hydraulic fracture stress interference from previous cluster fractures along the horizontal well completion. With the cluster fracture technique, horizontal wellbores with lengths greater than 5,000 ft. but less than 15,000 ft. were hydraulic fracture stimulated with 70%-85% reservoir volume coverage, thus allowing for economic development of shale oil and shale gas resource rock.

Today, 70% of all the gas and oil wells in operation or permanently abandoned wells that were developed in the 50's through the early 80's used single vertical hydraulic fracture stimulations. These wells drained only the most permeable sandstone lenses or carbonate high porosity zones therefore leaving over 50% of undrained reserves in the low permeability silt or carbonate silt lenses. Most of these wells are classified as stripper wells (low-producing or end-of-life wells). About another 10% of the well total population are horizontal wells that were completed using single vertical hydraulic fracture stimulation with 500+ ft. spacings.

Currently (2010+), the best practice is to develop new wells economically using horizontal drilling through vertically developed well fields to access low permeability silt and carbonate silt lenses across the fields that were not drained by the vertical well, wide-spaced (2000+ ft.) hydraulic fractures. The goal is to deliver a mono layer of proppant to the end of the hydraulic fracture to optimize the amount of proppant pumped and minimize the change in the stress direction of hydraulic fractures, i.e. so as not to fracture sand packing except near the wellbore. This process enables the economic development of these low permeability zones (tight zones) and creates production rates 2 to 44 times the original single-hydraulic fracture vertical well completion in the same reservoir volume due to the massive surface contact area in the reservoir volume. The aggregate of the horizontal recompletions has kept the gas production rate from declining in the mature tight gas sand fields.

With the advent of the multiple cluster fractures technique in horizontal wells, economic production rates can be achieved from nano-Darcy permeability resource rock such as organic shale. Typical horizontal wells are drilled into productive zones from 3,500 to 15.000 ft. true vertical depth with lengths from 3,000 to 15,000 ft. The cluster fracture is created with perforation intervals spaced between 10 ft. to 30 ft. apart and the total number of perforations ranging from 5 to 12. The spacing between cluster fractures ranges from 200 ft. to 400 ft. for a total of 10 cluster fractures to 50 cluster fractures. The overall effect of creating multiple cluster fractures in the reservoir volume is to have massive reservoir contact with the production wellbore. This minimizes the change in the hydraulic fractures' dip and azimuth along the complete length of the horizontal well and is optimized for 40/70 mesh to 100 mesh proppants. The prolific Middle East completions have experienced early water contact breakthrough on oil and gas wells from the natural faulting in the well drainage volume. This water problem requires extensive downhole control valve installation to prevent "watering out" the stimulated horizontal well.

The lower-quality, tight-gas, mature reservoirs, or modest-sized gas or oil reserves do not economically support a new horizontal well with cluster fracture completion. What is needed is a method to rubblize the tight sandstones and silt stone formations by multi-fracturing the near reservoir volume around the vertical well to drain isolated tight sandstone or silt stone bodies without drilling a horizontal well in the reservoir.

There is thus a present need for a method that enables the recompletion of wells with economic production rates—particularly one which enables the use of multi-fracture completion plus horizontal fracture to provide a significant surface reservoir drainage volume.

BRIEF SUMMARY OF EMBODIMENTS OF THE PRESENT INVENTION

Embodiments of the present invention relate to a method for creating a re-oriented hydraulic fracture in a target zone of a horizontal well, the method including accessing a plurality of perforations in well casing in the target zone, sequentially re-orienting a fracture at each of the plurality of perforations in the target zone by forcing a pressurized flow of fracking fluid sequentially through each of the plurality of perforations, monitoring in real time one or more attributes of hydraulic fracture shape, dip, and/or azimuth, packing the plurality of re-oriented fractures with proppant, and repeating the step of sequentially re-orienting a fracture at each of the plurality of perforations in the target zone at least until a dip of an adjacent re-oriented hydraulic fracture has rotated to a horizontal orientation. In the method, monitoring in real time one or more attributes of hydraulic fracture shape, dip, and/or azimuth can include using a micro-seismic and/or tilt meter. The method can also include verifying fracture tip screen out by monitoring, in real time, downhole injection pressure. Packing the plurality of re-oriented fractures with proppant can include packing the plurality of re-oriented fractures with proppant from about a tip of a re-oriented fracture to about the wellbore.

In one embodiment, the plurality of perforations can be spaced about 1 to about 3 feet apart. Monitoring in real time can include estimating a three-dimensional image of one or more fractures created in the target zone using data obtained during the real time monitoring. Monitoring in real time can include monitoring tilt from a two-dimensional surface array, monitoring a one-dimensional sub-surface array, and/or passive and active micro-seismic monitoring. Optionally, monitoring can include monitoring based on one or more of volume resistivity, dielectric constant, electro-magnetic, and/or a combination thereof.

Embodiments of the present invention also relate to a method for applying a multi-stage sequenced fracture treatment in a vertical well with multiple target production zones within a target reservoir. The method can include sequentially injecting a fracking fluid into a plurality of perforations to form fractures, injecting a proppant slurry having a first proppant concentration at a first injection flow rate into the formed fractures, monitoring a net pressure and injected proppant concentration to predict tip screen out, upon reaching the predicted tip screen out, increasing the proppant concentration to an amount greater than the first proppant concentration, and sequentially repeating the injecting and monitoring steps at least until a dip of an adjacent hydraulic fracture has rotated to a horizontal orientation. Optionally, the injecting and monitoring steps can be performed at well perforations that are spaced less than about 150 vertical feet apart and/or less than about 5 feet apart. In the method, monitoring a net pressure can include monitoring a net pressure from at or above a ground surface. The method can also include estimating at least one of fracture geometry, height, and/or fracture tip growth rate. The step of estimating at least one of fracture geometry, height, and/or fracture tip growth rate can include using at least one of a tilt array, a micro-seismic array, and/or an electro-magnetic array.

The multi-stage sequenced fracture treatment can be performed in one or more of an open hole, a gravel packed liner, and/or an uncemented liner. The multi-stage sequenced fracture treatment can be performed with a carbide jet nozzle. The multi-stage sequenced fracture treatment is performed with fracture injection gradient of about 1.6 pounds per square inch ("psi") per foot of true vertical depth to about 2.0 psi per foot of true vertical depth. The method can include moving a jetting tool up and/or down a wellbore by about 5 to about 20 feet for each fracture treatment.

In the method, the first proppant concentration can include a proppant concentration of about 0.5 pounds of proppant per gallon of slurry being injected to about 1 pound of proppant per gallon of slurry being injected. Injecting a proppant slurry can include injecting a proppant slurry at a rate of between about 0.5 barrels per minute to about 2.0 barrels per minute. Increasing the proppant concentration can include increasing the proppant concentration to about 8 pounds of proppant per gallon of slurry to about 16 pounds of proppant per gallon of slurry.

Embodiments of the present invention relate to reusing wells that were completed with a single vertical hydraulic fracture treatment to eliminate drilling costs by applying the new fracturing process. The goal of this process is to delaminate sand/shale or carbonate/shale interfaces to maximize the release of fossil fuels.

The process preferably connects multiple isolated sandstone and silt stone lenses around the wellbore by sequenced re-oriented hydraulic fracture treatments with an instantaneous shut-in pressure of at least about 1 psi/ft.

Each treatment is preferably initiated from a perforated interval less than about 2 ft. to prevent cluster fractures (multiple random fractures with uncontrolled dip and azimuth) and to enable a single, directed fracture with over about 1 psi/ft. residual gradient after treatment.

The first fracture in the sequence can be a normal single vertical fracture treatment that is packed with proppant.

Each sequenced re-oriented hydraulic fracture is preferably packed with proppant by initiating a fracture tip screen out. The objective of packing multiple layers (preferably more than 2 layers) of proppant in the hydraulic fracture slit is to leave over about 1 psi/ft. stress gradient on the fracture face. This deviates from current norms of leaving one or two layers of proppant in the hydraulic fracture slit with little to no additional stress on the fracture face.

With over about 1 psi/ft. stress gradient on the fracture face, the next sequenced re-oriented hydraulic fracture treatment rotates both dip and azimuth to approach a final horizontal fracture after several treatments.

This dynamic process is preferably configured such that each sequenced re-oriented hydraulic fracture treatment is completed before the reservoir rock can relax from the previous treatments and re-distribute the stress around the vertical wellbore. The next sequenced re-oriented hydraulic fracture treatment is preferably completed within about 5 days of the previous treatment.

Field experience shows that this process requires about 3 to about 6 sequenced re-oriented hydraulic fracture treatments to achieve a full horizontal fracture from the vertical wellbore below about 3,000 ft. true vertical depth.

Depths greater than about 10,000 ft. (true vertical) or a maximum horizontal stress over about 1.0 psi/ft. may need about 5 to about 6 sequenced re-oriented hydraulic fracture treatments to rotate the next fracture towards horizontal and delaminate sand/shale or carbonate/shale interfaces.

Applying this process at depths of less than about 3,000 ft. (true vertical) preferably only requires about 2 to about 3 sequenced re-oriented hydraulic fracture treatments to rotate the next hydraulic fracture towards horizontal and delaminate multiple sand/shale or carbonate/shale interfaces.

The process can use multiple real time fracture plane imaging tools to validate the rotations and dips of each sequenced re-oriented hydraulic fracture. Equipment can include micro-seismic, tilt, and electro-magnetic data monitors from surface and sub-surface arrays, which can visualize the fractures in 3D.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more embodiments of the invention and are not to be construed as limiting the invention. In the drawings:

FIG. 5A illustrates the aerial view of the sequenced re-oriented hydraulic fracture treatment restimulation of a vertical well as the fractures [vertical fracture 1, 2, 3, 4, and 5 (labeled [VF1], [VF2], [VF3], [VF4], [VF5])] rotate from the maximum horizontal stress towards the direction of minimum horizontal stress before the last fracture rotates toward horizontal [horizontal fracture 1 (labeled [HF1])];

FIG. 5B illustrates the North-South cross section of the sequenced re-oriented hydraulic fracture treatment restimulation as the dip of each sequenced fracture [vertical fracture 1, 2, 3, 4, and 5 (labeled [VF1], [VF2], [VF3], [VF4], [VF5])] rotates toward horizontal ([horizontal fracture 1 (labeled [HF1])];

DETAILED DESCRIPTION OF THE INVENTION

Figure 1:
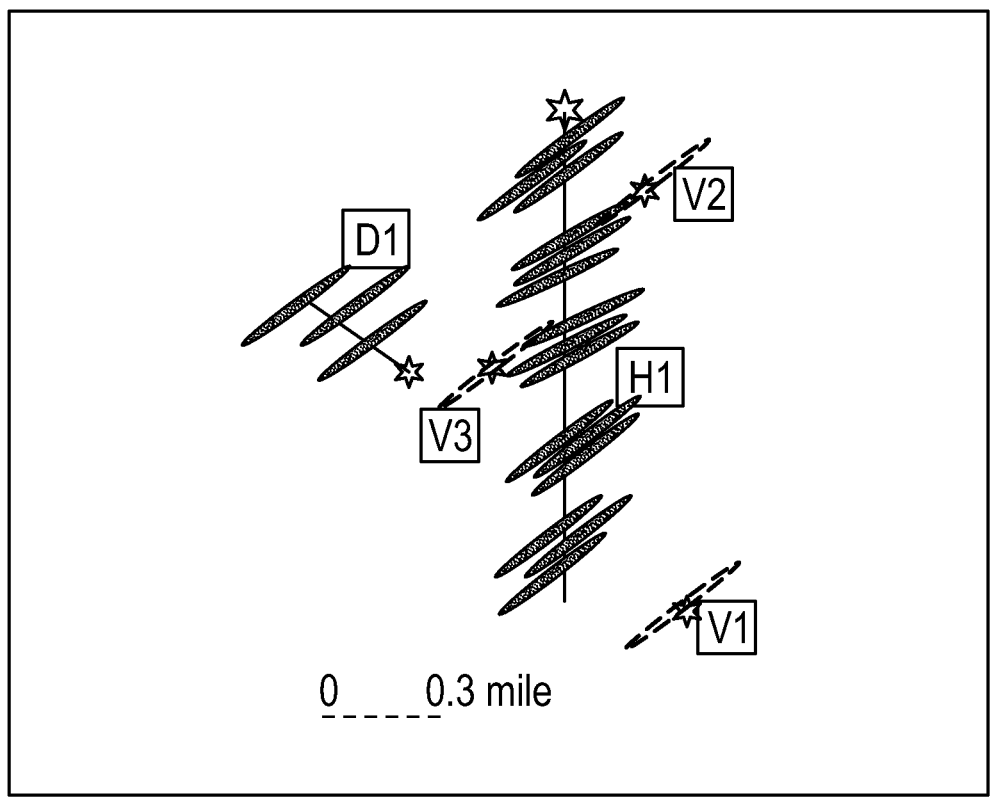
FIG. 1 illustrates an aerial view of 3 mature vertical well completions, vertical well 1 [V1], vertical well 2 [V2], and vertical well 3 [V3], 1 deviated well completion (deviated well 1 labeled [D1]) and a horizontal well using the cluster fracture technique (horizontal well 1 [H1]) in a tight East Texas gas field.

Embodiments of the present invention enable the recompletion of wells with economic production rates, using a multi-fracture completion plus horizontal fracture to replicate the massive surface contact area in the reservoir drainage volume of a horizontal well with cluster fracture completion. With radially spaced hydraulic fractures surrounding the vertical well, the average fractured matrix block size is like the average cluster fracture matrix block size. The multiple hydraulic fractures connect the isolated thin tight sandstones and silt stones with the production wellbore, thus making the new completion process economical for mature or abandoned oil and gas reservoirs. Embodiments of the present invention preferably use micro-seismic and electro-magnetic monitoring methods to detect and locate current fracture planes in 3 dimensions to verify stimulation of the treated reservoir drainage volume of the re-completed vertical wellbore.

Although the application describes the formation of horizontal fractures, it is to be understood that the term "horizontal" is intended to refer to fractures that are non-vertical and can thus include, but is not limited to, fractures that follow along a subsurface layer of material even when that layer is not truly horizontal (i.e. even when it is not at perfectly 90 degrees with respect to a vertical axis). Thus, a "horizontal" fracture can include a fracture that is positioned at substantially any angle of from at or about 45 degrees up or down with respect to a vertical axis to at or about 90 degrees with respect to a vertical axis.

Real time monitoring methods are preferably used for estimating the 3-D image of the multiple fractures created in the reservoir volume originating from the original vertical wellbore using this new process. These real time monitoring services can include tilt from 2-D surface array and 1-D sub-surface array, passive and active micro-seismic from 2-D surface array and 1-D sub-surface array, and volume resistivity and dielectric constant or electro-magnetic from 2-D surface array and 1-D sub-surface array.

3-D imaging of the cluster fractures is not normally used in field development of shale oil or gas reservoirs because of the expense. The expense is cheaper to lose 1 to 3 cluster fractures out of 40+ cluster intervals in a horizontal well than to pay for the rig and hydraulic fracture crews to wait on the micro-seismic analysis of each cluster fracture treatment.

An embodiment of the present invention is directed to using hydraulic fracture stress interference around a wellbore, particularly to rotate the hydraulic fracture dip and azimuth from vertical parallel to the minimum horizontal stress direction to horizontal parallel to the overburden stress direction as illustrated in FIGS. 5A and 5B. By radially fracturing from the wellbore by at least, for example, about 500 ft. in all directions, petroleum fluids are drained from smaller matrix blocks and isolated productive sand/carbonate/sift lens/channels are connected to the wellbore.

To intentionally create a horizontal stress interference pattern in the reservoir rock matrix, each hydraulic fracture initiated in the perforated interval is most preferably packed with proppant from the tip of the fracture back to the perforated interval in the wellbore. By packing each sequential fracture (vertical fracture; VF1, VF2, VF3, VF4, VF5) to about 1 or more psi/ft gradient, the least principal stress is rotated from horizontal to vertical as illustrated in FIG. 5A, thus rotating the fracture to near horizontal (HF1). This proppant packing method in the fracture is different from traditional slick water fracture treatments where proppant is moved by sweeping dunes in the bottom of the fracture crack/slit or with viscous cross linked polymer fluids that suspend the low concentrations of proppant in the fracture volume. The purpose of packing the fracture with proppant above about 1 psi/ft. gradient is to maintain this horizontal stress state on the fracture face after the hydraulic fluid has leaked off into the formation in order increase both the maximum and minimum horizontal stress states to above about 1 psi/ft. so that the vertical stress is the least principal stress to generate a horizontal fracture in the reservoir rock. The proppant packing for generation of about 1 or more psi/ft. stress gradient of the fracture face preferably may need a proppant concentration of at least about 5+ lbs./sq. ft. which greatly exceeds the normal about 2-3 lbs./sq. ft. requirement for high conductive fractures to drain the local reservoir matrix blocks.

After packing each fracture with proppant to about 1+ psi/ft. stress gradient, the new interference stress will slowly decrease as the reservoir rock matrix "creep flows" over days of time. But, for the 3-10-day timeframe of the sequenced re-oriented hydraulic fracture treatments to the perforated interval, the multiple hydraulic fracture stress planes will create a constructive interference horizontal stress state to rotate the next sequenced re-oriented hydraulic fracture towards a horizontal position. This additive stress will increase the minimum and maximum horizontal stress beyond about 1 psi/ft., thus making the vertical stress the minimum stress to create the horizontal fracture. The last horizontal fracture can be propagated beyond the stress caged rock matrix around the perforated interval due to delamination of shale-sand interfaces or shale-carbonate interfaces.

If the perforated interval is over about 30 ft. in length, the total interval can be split with a bridge plug for pumping down the completion tubing or the casing if the original casing can pass the pressure test. An alternative is to cement squeeze the whole interval and shoot a new about 1 to about 3 ft. perforated interval, with a preferred interval of about 2 ft.

For casing test pressure failure, a scab liner can be set across the interval to isolate the wellbore and a new about 1 to about 3 ft. perforation interval (with a preferred interval of about 2 ft.) is preferably shot for the sequenced re-oriented hydraulic fracture treatments. An alternative solution for corroded production casing or open hole completions that do not withstand over about 1 psi/ft. gradient, can use hydraulic jet fracturing equipment to pump the proppant for each sequenced re-oriented hydraulic fracture treatment.

To verify dip and azimuth rotation, embodiments of the present invention preferably use multiple real time fracture plane visualization techniques, which can include for example micro-seismic, tilt and electro-magnetic data to monitor the placement of multiple fractures in the reservoir volume radiating from the perforated interval in the wellbore.

By including friction pressure calculations in the tubing and fracture, each new fracture plane direction can be matched for initial rotation in the near wellbore volume for the new 3 principal stress directions and the rotation of the actual fracture plane as the distance increases from the perforated interval in the wellbore.

Figure 4:
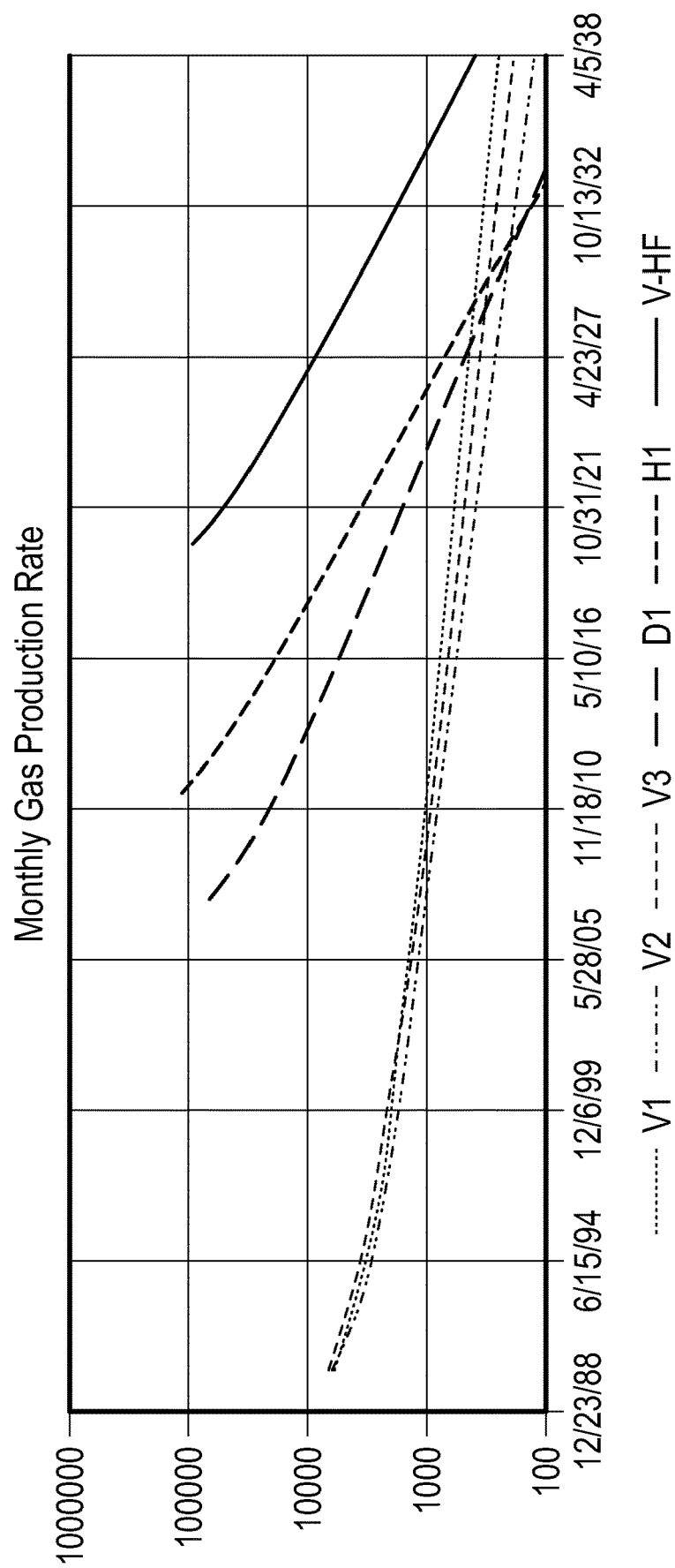
FIG. 4 is a graph which illustrates a comparison of the performance of the sequenced re-oriented hydraulic fracture treatment re-stimulation of vertical well to three vertical wells, a deviated well multiple hydraulic fractures and horizontal well with cluster fracture re-stimulation.
Figure 7:
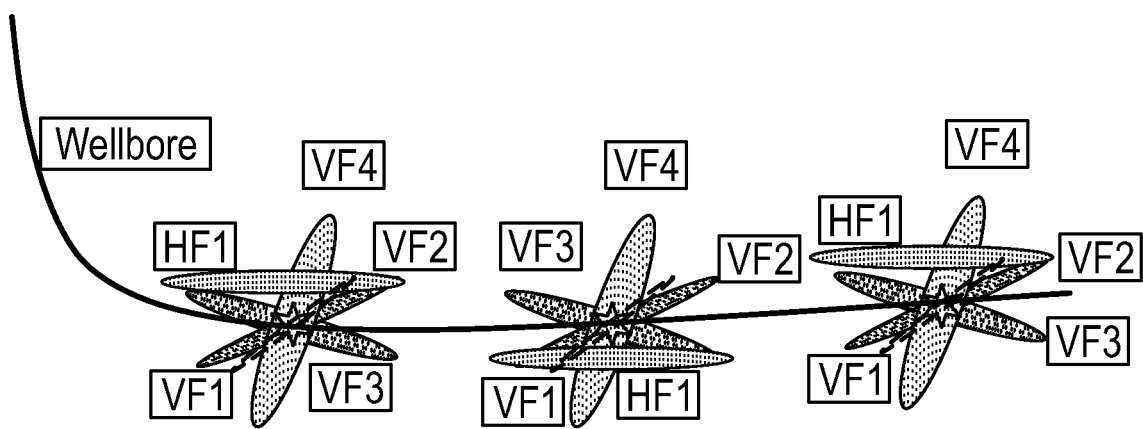
FIG. 7 illustrates a series of sequenced re-oriented hydraulic fracture treatment reorientations in a horizontal well that was previously simulated with the cluster fracture stimulation technique, and which highlights that horizontal fracture can occur both above and below the drilled horizontal wellbore.

Once the horizontal fracture is achieved, delamination of the sandstone, carbonate, and/or silt stone formations will occur and propagate beyond the about 3 to about 6 previous sequenced re-oriented hydraulic fracture treatments to connect multitudes of isolated productive lenses to the vertical well. As illustrated in FIG. 4, the sequenced re-oriented hydraulic fractured vertical well will produce similar gas and/or oil production rates as a horizontal well stimulated with cluster fracture technique in the same reservoir volume at a fraction of the cost. This hydraulic fracturing process is applicable for multiple productive zones at different depths in the marginal vertical well. For marginal horizontal wells, the sequenced fracture process is used at different measured depths as illustrated in FIG. 7 to restimulate the well by connecting isolated sand/carbonate/silt channel or lens to the wellbore for production.

Figure 6:
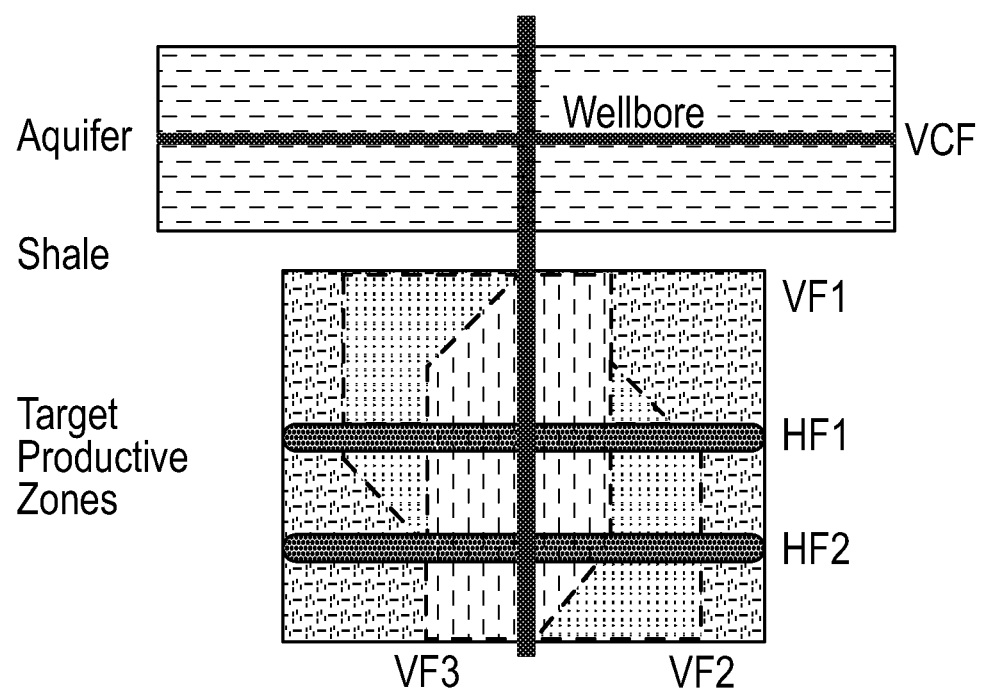
FIG. 6 illustrates a cement fracture (labeled [VCF]) in an aquifer zone above the target production reservoir zone to prevent fracture height growth into an aquifer zone.

For shallow heavy oil development less than about 2,500 ft. in true vertical depth, a sequenced fracture treatment can be used to increase the local horizontal and vertical stresses for enhanced oil recovery operations such as steam, carbon dioxide and/or water injection. It is also used in the production wells to enhance vertical displacement and prevent water coning up or gas coning down into the perforated interval. The horizontal-fracture location is preferably in about the bottom ⅓ of the formation thickness for water displacement of oil bottom up in the flood pattern or horizontal-fracture location is preferably in about the top ⅓ of the formation thickness for steam or carbon dioxide displacement of oil top down in the flood pattern. Both versions of horizontal fracture stimulation are illustrated in FIG. 6 as horizontal fractures (HF1 and HF2). If an aquifer is located above the oil zone, then the horizontal and vertical stress gradient can be increased with a sequenced re-oriented hydraulic cement fracture (vertical fractures, VF1, VF2, and VF3 followed by HF1) in the aquifer zone before the sequenced re-oriented hydraulic treatment (vertical fractures, VF1, VF2, and VF3 followed by HF2) in the target reservoir zone.

This completion process has eliminated the need for multi-lateral horizontal well with cluster fracture treatment at different vertical depths in lenticular formations. This new technique allows for the economically feasible redevelopment of the vertical and horizontal wells with single vertical hydraulic fracture stimulations in existence today. This marginal vertical and horizontal well population comprise 80% of all oil and gas wells in the United States today.

Embodiments of the present invention relate to a method for applying a multi-stage sequenced fracture treatment in a vertical well having a plurality of perforations in one near-homogeneous target production zone that is depleted with a final instantaneous shut-in pressure that preferably exceeds about 1 psi/ft. of depth. This can include injecting an initial fracturing fluid and then a proppant slurry (for example about 0.5 to about 1 lbs. per gallon) at a rate between about 0.5 to about 2.0 barrel per minute per feet with a most preferred rate being about 0.7 to about 1 barrel per minute per feet of perforated interval to achieve a fracturing pressure of the target zone.

From the surface, the net pressure and injected proppant concentration are preferably monitored, and with a tilt array, a micro-seismic array, and an electro-magnetic array, the fracture geometry, height, and fracture tip growth rate are preferably estimated. The arrays preferably cover at least about 1,500 feet radius around the vertical or horizontal perforated interval. After prediction of tip screen out, the proppant concentration is preferably increased from about 1 to about 8 lbs. to about 18 to about 18 lbs. per gallon, depending on fracture fluid viscosity, to complete the fracture volume packing with at least about 0.9 psi/ft. instantaneous shut-in pressure but most preferably at least about 1 psi/ft. instantaneous shut-in pressure.

A Sequenced re-oriented hydraulic fracture of the target zone is preferably performed at about a 1 to about 3 ft perforated interval with a preferred perforated interval of about 2 ft., with proppant packing of each fracture from the fracture tip to the wellbore. The fracture treatment of the target interval is preferably repeated until the dip of the next sequenced re-oriented hydraulic fracture has rotated to horizontal, thus completing the sequenced re-oriented hydraulic fracture technique.

The hydraulic fracture shape, dip, and azimuth are preferably monitored in real time with micro-seismic and tilt meter. The downhole injection pressure is preferably monitored in real time to verify fracture tip screen out.

As previously described, embodiments of the present invention preferably relate to a method for applying a mufti-stage sequenced fracture treatment in a vertical well with multiple thin heterogeneous (mixed formations) target production zones that are depleted that would be produced in a co-mingled completion. This would be considered a vertically oriented multiple perforated intervals, sequenced re-oriented hydraulic fracture treatment in a vertical well. The method preferably includes injecting an initial fracturing fluid and then a proppant slurry (for example about 0.5 to about 1 lbs. per gallon) at a rate between about 0.5 to about 2.0 barrel per minute to achieve a fracturing pressure of the target zone.

From the surface, the net pressure and injected proppant concentration are preferably monitored, and with a tilt array, a micro-seismic array, and/or an electro-magnetic array, the fracture geometry, height, and fracture tip growth rate are preferably estimated. After prediction of tip screen out, the proppant concentration is preferably increased from about 1 to about 8 lbs. or up to about 16 lbs. per gallon with a most preferred concentration of about 16 lbs. per gallon depending on fracture fluid viscosity to complete the fracture packing with proppant.

Sequenced re-oriented hydraulic fracture of the target zone is preferably performed with proppant packing of each fracture from the tip to the wellbore. The fracture treatment of the target interval is preferably repeated until the dip of next sequenced re-oriented hydraulic fracture has rotated to horizontal completing the sequenced re-oriented hydraulic fracture treatment. This is preferably repeated at least about every 100 ft and most preferably about every 60 ft. of true vertical depth across the multiple thin zones in the target reservoir formation.

Embodiments of the present invention also relate to a method for applying a multi-stage sequenced fracture treatment in a horizontal well that intersects multiple naturally fractured shale zones and multiple thin isolated sandstone and silt stone bodies. This preferably includes injecting an initial fracturing fluid and then a proppant slurry (for example about 0.5 to about 1 lbs. per gallon) at a rate between about 0.5 to about 2.0 barrel per minute to achieve a fracturing pressure of the target zone using a cluster perforated interval.

From the surface, the net pressure and injected proppant concentration are preferably monitored, and with a tilt array, a micro-seismic array, and/or an electro-magnetic array, the fracture geometry, height, and fracture tip growth rate are preferably estimated. After prediction of tip screen out, the proppant concentration is preferably increased from about 1 to about 8 lbs. to about 16 lbs. per gallon with a most preferred concentration of about 16 lbs. per gallon depending on fracture fluid viscosity to complete the fracture packing with proppant.

Sequenced re-oriented hydraulic fracture of the about 1-3 ft. perforated interval is performed with a preferred perforated interval of about 2 ft. with proppant packing of the fracture from the tip to the wellbore until the dip of the next sequenced re-oriented hydraulic fracture has rotated horizontal completing the sequenced re-oriented hydraulic fracture treatment for the cluster interval.

Using a foregoing method of an embodiment of the present invention, the sequenced re-oriented hydraulic fracture treatment is preferably completed in open hole, gravel packed liner or uncemented liner with carbide jet nozzle with a fracture injection gradient of about 1.6 to about 2.0 psi/ft. of true vertical depth.

With each sequenced fracture treatment, the jetting tool is preferably moved up or down the wellbore by at least about 5 feet, but preferably less than about 20 ft., with a most preferred movement of about 10 ft. The sequenced fracturing is preferably completed with coil tubing or with drill pipe.

Most preferably a carbide nozzle is used which has a diameter of between about % to about % inch with a most preferred diameter of about ⅜ inch. The casing annulus pressure is preferably monitored for injection pressure.

In the foregoing method, the proppant slurry can be replaced with Portland or Pozzolan hydraulic cement, to cement fracture the aquifer volume around the wellbore and prevent hydraulic fracture growth from the target reservoir zone into the aquifer. Using claim 5, complete the sequenced re-oriented hydraulic fracture treatment using hydraulic cement in aquifer, fault or weak thief zone above or below the target oil or gas production zone to increase the minimum horizontal stress gradient to at least about 0.9 psi/ft. with most preferred at about 1.0 psi/ft. so the vertical direction is the least principal stress. This procedure will create sequenced "T" shaped hydraulic fractures in claim 1 that will have a horizontal and vertical growth component on the tilt meter data in real time. In addition, for perforated intervals less than about 2,000 ft. true vertical depth, the hydraulic cement can be injected to raise the land surface above the sequenced re-oriented hydraulic fracture treatment zone. If raising land surfaces over 3 in., multiple perforated intervals can be provided and the cement in each previous fracture is preferably given time to cure.

INDUSTRIAL APPLICABILITY

The invention is further illustrated by the following non-limiting examples.

As background, 70% of all the gas and oil wells in operation or permanently abandoned in USA were developed in the 50's through the early 80's using single vertical hydraulic fracture stimulations. These vertical wells drained only the most permeable sandstone lenses therefore leaving over 50% of undrained reserves in the low permeability silt lenses. Most of these mature wells are classified as stripper wells (low-producing or end-of-life wells). About another 10% of the well population is comprised of older, short length, horizontal wells that were completed using single vertical hydraulic fracture stimulations. Unless there is surface casing failure, these old wells can be re-stimulated with the sequenced fracture treatment process according to embodiments of the present invention.

Thus, the objective is to fracture old vertical well completions and older horizontal completions that did not cluster fracture uniformly and drill new horizontal wells in mature reservoirs and complete them with multiple sequenced re-oriented hydraulic fracture treatments to drain a large portion the remaining 50% hydrocarbons from the thin isolated sand bodies.

Instead of drilling new horizontal wells into thin productive zones, the sequenced re-oriented hydraulic fracture process can be used to restimulate the well even if perforations are open above or below the target production interval. The best method for casing isolation is cement squeezing or plugging the open perforated intervals with plastic or dissolvable balls. The new perforations can be hydraulically fracture treated down the isolated casing.

For open hole, slotted liners, gravel packed liners, or casing integrity failure, the new interval can be stimulated with hydraulic jet fracturing technique. The proppant laden mixture can be pumped through ceramic nozzles at 1.2 to 1.5 psi/ft. gradient at the selected interval. The surface fluid pressure in the injection tubing-casing annulus can be used to monitor the injection pressure at the perforated interval.

For thin productive zones with thin isolation shale between water zones such as a sand/shale sequence with some sandstone layers having nearly 100% water/brine saturation, there is the sequenced cement fracture technique to increase the horizontal stress above or below the target perforated interval, thus preventing vertical height growth the proppant packed fracture from growing into the water zone from the productive formation. The reactive proppant size for the cement fracture will range between about 200 to about 400 mesh size and the Portland cement content will range from about 4 to about 8 weight percent.

Another isolation problem case is where a fault intersects the wellbore and has been flushed out with brine during the previous production life of the well. Most faults are not clean fractures in the rock matrix but a swarm of smaller fractures, thus sequenced re-oriented hydraulic fracture treatment using cement (instead of proppant) is used to seal the swarm of factures for future brine free oil or gas production. The perforated interval is preferably at least about 10 feet above and below the fault intersection with the wellbore. The interval is preferably then cement fractured until the instantaneous shut in pressure is over about 0.9 psi/ft.

Another problem case is where a pore pressure depletion due to production of oil and/or gas has caused matrix rock failure in compression due to low cementation of mineral grains. The rock matrix failure caused the fracture gradient to drop below about 0.55 psi/ft., thus becoming a thief zone for the simulation fluid and proppant mixtures. The sequenced re-oriented hydraulic fracture treatment using cement instead of proppant is now preferably used to restore both the minimum horizontal stress and the matrix rock strength to the failed zone around the wellbore. The interval is then sequentially cement fractured until the instantaneous shut in pressure is over about 0.9 psi/ft.

Example 1—East Texas Cotton Valley Gas Reservoir

FIG. 1 illustrates a typical well development in time for the Cotton Valley formation in East Texas. The vertical wells were drilled first and completed with a vertical hydraulic fracture stimulation for main sandstone bodies. The time delay between the first vertical well, V1 and the last vertical well. V3, could be up to 10 years. The last well shows some depletion in the highest permeability sandstone body. The deviated well was drilled up to 25 years later with at least 2 hydraulic fractures per sand body as the deviated wellbore can be perforated in the same sand body in different points in space. The horizontal well was drilled up to 40 years later (year 2012+) than the first vertical well completion and was completed with the cluster fracturing technique. Even though the main sand bodies completed in vertical wells, V1, V2 and V3, show significant pressure depletion on the current buildup test (year 2012+) in the main sand bodies, the cluster fractures in the new horizontal well intersect enough thin isolated sand bodies to show no pressure depletion at the initial pressure build up test for the horizontal well.

Figure 2:
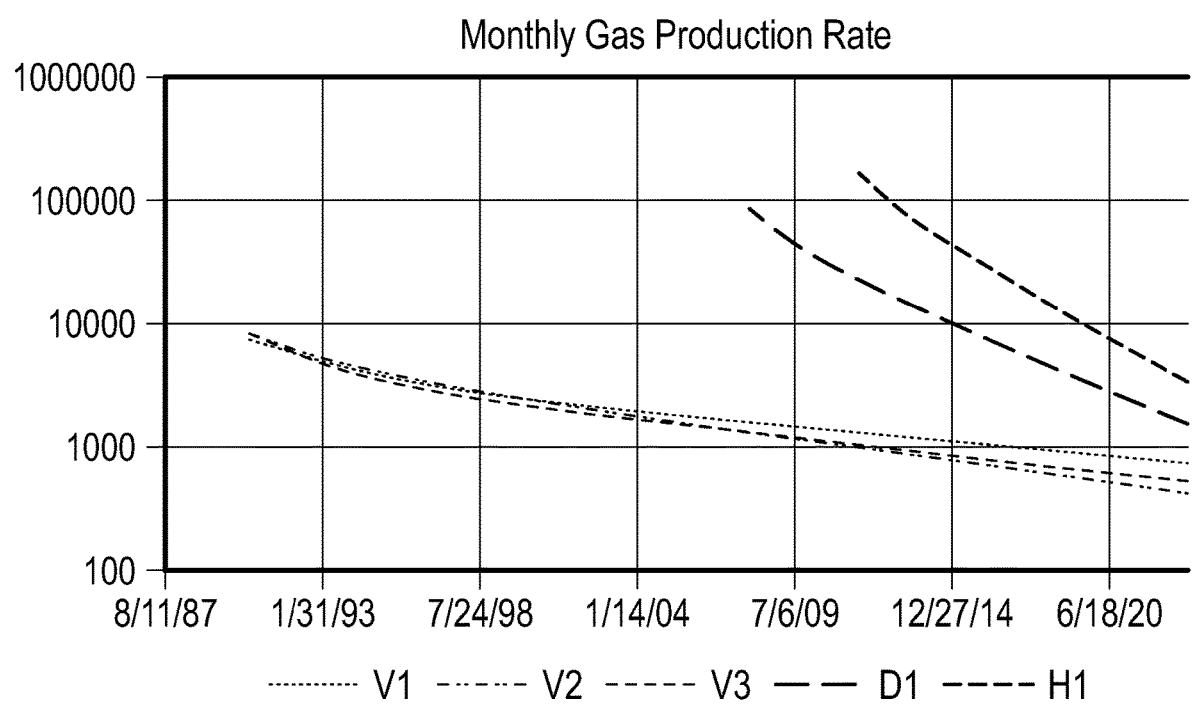
FIG. 2 illustrates the gas production rate for the horizontal well, deviated well and surrounding depleted vertical wells of FIG. 1.

FIG. 2 illustrates the tight gas sand production profile for the three vertical wellbores with vertical fracture treatments, a deviated wellbore with vertical fracture treatments, and a horizontal wellbore with multiple cluster fracture treatments. The vertical wellbore production profiles are remarkably similar since the operators were completing the same thick sand bodies and using nearly the same sand volume size for the vertical fracture treatment. This was called "cookie cutter" gas field development plan. Later, another operator drilled a deviated well (D1) using almost 3 times the sand volume as the vertical wells (V1, V2, & V3) with the single fracture treatment and its gas production profile showed that more fracture face surface area was created, but the drainage volume is approximately the same because the decline rate is steeper. Finally, the horizontal well (H1) with cluster fracture completion technique used a sand volume 5 to 10 times the vertical well completion and its gas production decline rate is higher than the deviated well because the higher fracture surface area can drain the larger reservoir volume faster.

Figure 3A:
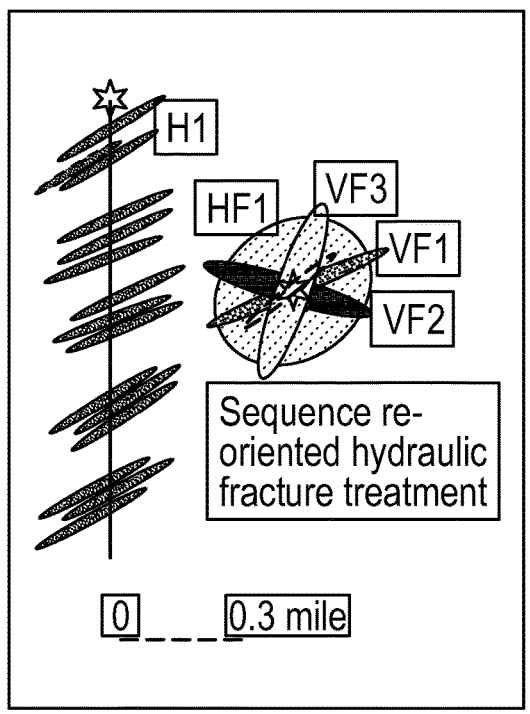
FIG. 3A illustrates the aerial view of the sequenced re-oriented hydraulic fracture treatment from a vertical well.
Figure 3B:
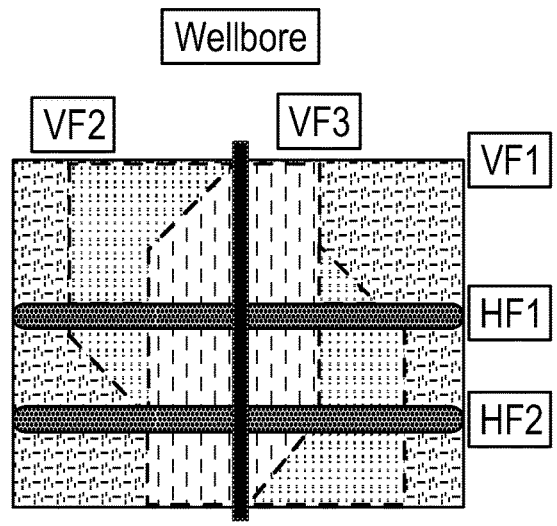
FIG. 3B illustrates a cross-sectional view of the sequenced re-oriented hydraulic fracture treatment from a vertical well [vertical fracture 1, 2, and 3 (labeled [VF1], [VF2], [VF3] respectively) and horizontal fracture 1 (labeled HF1)]

FIG. 3A illustrates an aerial view of a horizontal well segment with a cluster fracture completion and a vertical well with a sequenced re-oriented hydraulic fracture treatment, sequenced re-oriented hydraulic fracture treatment consist of sequenced re-oriented hydraulic fracturing in the same zone until the minimum confining stress has rotated from horizontal to vertical, thus creating at least one horizontal fracture in the formation. The rotation of minimum horizontal stress was determined with real time microseismic data and the fracture plane dip was determine with tilt meters. FIG. 3B is a cross sectional view of the vertical well hydraulic fracture stimulation along the initial vertical fracture, VF1. Vertical fractures, VF2 and VF3, leave the plane at different azimuths from the wellbore. The two sub-horizontal (90-81 degrees) fractures, HF1 and HF2, are also shown. The horizontal fractures will occur between a sand-shale interfaces. The surface tilt meter data will reconstruct the ground movement as a "T" fracture shape because there is vertical and horizontal movement of the rock matrix.

FIG. 4 compares the gas production from the vertical well's sequenced re-oriented hydraulic fracture treatment with prior completion techniques. The 3 original vertical wells (V1, V2, & V3) with single vertical fractures are also shown for comparison. The initial vertical sequenced re-oriented hydraulic fracture treatment (V-HF) gas rate is greater than the deviated well completion (D1), but less than the 0.9-mile horizontal cluster fracture completion (H1). The decline rate of the vertical sequenced re-oriented hydraulic fracture is greater that the deviated well due to smaller fractured matrix block size and slightly less than the 0.9-mile horizontal cluster fracture completion due to slightly larger average matrix block size.

FIGS. 5A & 5B illustrate the reconstructed sequenced re-oriented hydraulic fracture paths from the micro-seismic probably cloud of events of an ideal thick sand body with no natural fracturing completed with the sequenced re-oriented hydraulic fracture treatment. FIG. 5A is the aerial view at the center perforation and FIG. 5B is the North-South cross-sectional view intersecting the wellbore. Both the azimuth and dip where verified with surface and downhole tilt meter data. Note, both the azimuth and dip rotate with each new sequenced re-oriented hydraulic fracture treatment which in turn reduces the matrix block size in the reservoir drainage volume and increases the man-made fracture face surface area. The gas production rate and gas reserves are greater than the original vertical production wells (V1, V2, & V3) as illustrated in FIG. 4 with curve V-HF.

Example 2—Oklahoma Gas Reservoir with Upper Brine Aquifer

In Oklahoma there are oil or gas zones that have a bounding aquifer separated by a thin shale layer. FIG. 6 illustrates a gas well completion below a brine aquifer. Production experience in this area shows that produced aquifer water would water block the hydraulic fracture well over time, thus reducing gas reserves of the production well. Under normal stress levels, the hydraulic fracture would grow up into the aquifer as fracture length increased. This problem has caused operators in the area to use smaller fracture treatments and increase the probability of a sub-economic gas production well. Note, the horizontal well completed with cluster fracture technique would also have the aquifer production problem and field experience shows the additional water production usually will log-off the last ⅓ of the horizontal well.

The sequenced fracture treatment would also grow into the aquifer if the aquifer principal horizontal stress gradient is low enough to propagate the vertical fracture. The sequenced cement fracture process is used to pre-stress the aquifer formation prior to sequenced re-oriented hydraulic fracturing the target reservoir formation. Pre-stressing the aquifer formation to about 1 psi/ft makes the vertical stress direction the minimum principal stress. Micro-seismic data and down hole tilt data showed the sequenced vertical fractures have a "T" shape at the reservoir/aquifer interface around the vertical well. The gas production data showed the sequenced re-oriented hydraulic fractures do not significant grow up into the aquifer zone and stays confined in the target reservoir zone. Thus, the operator now can stimulate this type reservoir formation and develop the field with economic wells.

Example 3—Texas Old Horizontal Well Recompletion

As discuss, about 10% of the well population consist of older horizontal wells completed with single vertical fractures along the wellbore. FIG. 7 illustrates a horizontal well segment simulated with the sequenced re-oriented hydraulic fracture treatment. Micro-seismic shows rotation of the fracture azimuth and that the generated horizontal fracture does not occur in the same plane between perforated intervals. The horizontal fracture can occur above and below the horizontal wellbore. This technique maximizes the man-made fracture intersection with multiple isolated thin sand/silt bodies in a thin sand/silt/shale sequence due to the increase in minimum horizontal stress to breakthrough sand/shale sequences. Micro-seismic showed that this technique is about 40% more successful at intersecting thin isolated zones than the current cluster fracture technique in a horizontal well because the cluster fracture technique does not increase the minimum horizontal stress to break through the sand/shale layer sequence, thus only stimulating the zones with the lowest horizontal principal stress. The sequenced re-oriented hydraulic fractures make successive "T" fractures as next fracture grows into the next set of sand/shale layers. The process is repeated until all target reservoir layers or sand channels are stimulated with a fracture treatment.

Example 4—Shallow Fruitland Coal Completion in New Mexico

In the San Juan Basin, most of the oil or gas productive formations outcrop along the edge of the basin. The edge of the basin has oil reservoirs due to isolation of sand/carbonate block with strike-slip fractures. The Fruitland Coal formation contains natural gas because it is absorbed in the coal matrix itself. The coal formation does contain natural fractures that are partially cemented with calcium rich salts such as calcium carbonate and calcium sulfate. A single fracture treatment will create a "T" fracture shape a follow the direction of the natural fracture azimuth. To propagate a sequenced re-oriented hydraulic fracture across the natural fractures in coal, the constructive interference vertical and horizontal stress should exceed about 0.9 psi/ft. and less than about 1.2 psi/ft with the most preferred induced stress of about 1.05 psi/ft. The sequenced re-oriented hydraulic fracture process hydraulically fractures the coal seam completely around the wellbore linking multiple natural fractures swarms to the production well bore. The multiple link natural fracture swarms allow economic gas production rates from shallow completions for full field development. Again, real time micro-seismic and tilt meters are used to monitor the hydraulic fracture shape, dip, and azimuth during each treatment. Nitrogen or carbon dioxide foam hydraulic fluid is used for proppant transport and to provide high pressure gas during flow back to remove the injected water from the hydraulic fracture. Field production results show that quick production of water from the hydraulic fracture and the natural fracture swarms prevents water blocking of the natural fracture system in the coal seam.

The preceding examples can be repeated with similar success by substituting the generically or specifically described components and/or operating conditions of embodiments of the present invention for those used in the preceding examples.

Example 5—Shallow Land Raising Along the Gulf of Mexico

Along the coast of the Gulf of Mexico, multiple new deltaic sand/silt/clay sequences have not been compacted with overburden pressure due to the high pore pressure of the sand/silt/clay layers. As the municipal water supply wells have drained the higher permeability sand layers, the silt and clay layers have compacted, and the surface of the land has subsided up to 10 feet in the younger deltaic river zones. The land surface is raised to original super-sea level by building a new layer of uniformly thick bedrock between the sand layers and the clay layers. The new bedrock can be made from Portland or Pozzolan cement mixtures depending on the strength and pump time required to lift the land mass. Multiple vertical wells using the sequenced re-oriented hydraulic fracture process are preferably used to delaminate the clay/silt or clay/sand interface in real time at depths less than about 2000 ft, but more preferably less than about 1000 ft. Complete real time surface micro-seismic and electro-magnetic arrays and real time laser tomography array is used to control the surface land lifting while visualizing the creation of the new bedrock layers. The liquid cement body acts like a balloon until the yield stress of the cement exceeds the vertical stress of the overburden area, so great care must be used to detect natural fracture dilation with the liquid cement, so the liquid cement body does not deflate or cause the surface of the land to tilt. The pozzolan for the cement mixture can be manufactured from waste mining residue by grinding coal combustion residual from power plants, red mud from aluminum metal refining, dredged marine silt and other mining tailings.

The preceding examples can be repeated with similar success by substituting the generically or specifically described components and/or operating conditions of embodiments of the present invention for those used in the preceding examples.

Note that in the specification and claims, "about", "approximately", and/or "substantially" means within twenty percent (20%) of the amount, value, or condition given.

Embodiments of the present invention can include every combination of features that are disclosed herein independently from each other. Although the invention has been described in detail with particular reference to the disclosed embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference. Unless specifically stated as being "essential" above, none of the various components or the interrelationship thereof are essential to the operation of the invention. Rather, desirable results can be achieved by substituting various components and/or reconfiguring their relationships with one another.

What is claimed is:

1. A method for creating a re-oriented hydraulic fracture in a target zone of a horizontal well comprising:
   accessing a plurality of perforations in well casing in the target zone;
   sequentially re-orienting a fracture at each of the plurality of perforations in the target zone by forcing a pressurized flow of fracking fluid sequentially through each of the plurality of perforations;
   monitoring in real time, one or more attributes of hydraulic fracture shape, dip, and/or azimuth;
   packing the plurality of re-oriented fractures with proppant; and
   repeating the step of sequentially re-orienting a fracture at each of the plurality of perforations in the target zone at least until a dip of an adjacent re-oriented hydraulic fracture has rotated to a horizontal orientation.

2. The method of claim 1 wherein monitoring in real time, one or more attributes of hydraulic fracture shape, dip, and/or azimuth comprises using a micro-seismic and/or tilt meter.

3. The method of claim 1 further comprising verifying fracture tip screen out by monitoring, in real time, downhole injection pressure.

4. The method of claim 1 wherein packing the plurality of re-oriented fractures with proppant comprises packing the plurality of re-oriented fractures with proppant from within 20% of a distance from a terminal end of a re-oriented fracture to within 20% of a distance from a wellbore.

5. The method of claim 1 wherein the plurality of perforations are spaced about 1 to about 3 feet apart.

6. The method of claim 1 wherein monitoring in real time comprises estimating a three-dimensional image of one or more fractures created in the target zone using data obtained during the real time monitoring.

7. The method of claim 1 wherein monitoring in real time comprises monitoring tilt from a two-dimensional surface array.

8. The method of claim 1 wherein monitoring in real time comprises monitoring a one-dimensional sub-surface array.

9. The method of claim 1 wherein monitoring in real time comprises passive and active micro-seismic monitoring.

10. The method of claim 1 wherein monitoring in real time comprises monitoring using an element selected from a list consisting of volume resistivity, dielectric constant, electro-magnetic, and a combination thereof.

* * * * *